United States Patent [19]

Sekizawa et al.

[11] Patent Number: 4,663,662

[45] Date of Patent: May 5, 1987

[54] PICTURE SIGNAL PROCESSING SYSTEM FEATURING SIMPLE OR DITHERING BINARIZATION PROCESSING SELECTED IN RESPONSE TO LOCAL VARIATIONS IN PICTURE DENSITY

[75] Inventors: Hidekazu Sekizawa, Yokohama; Kiyoshi Yamada, Tokyo; Shuzo Miura, Tokyo; Yasuo Hosaka, Tokyo, all of Japan

[73] Assignee: Tokyo Shibaura Denki Kabushiki Kaisha, Kawasaki, Japan

[21] Appl. No.: 556,323

[22] Filed: Nov. 30, 1983

[30] Foreign Application Priority Data

Nov. 30, 1982 [JP] Japan ................... 57-208474
Aug. 12, 1983 [JP] Japan ................... 58-146532

[51] Int. Cl.⁴ .................. H04N 1/46; H04N 1/40; G03F 3/08
[52] U.S. Cl. ..................... 358/75; 358/80; 358/280; 358/283; 358/284
[58] Field of Search ........... 358/75, 78, 80, 283, 358/298, 284, 280, 282; 382/42, 50, 51, 52, 53

[56] References Cited

U.S. PATENT DOCUMENTS

| | | | |
|---|---|---|---|
| 3,937,878 | 2/1976 | Judice | 358/240 |
| 4,127,871 | 11/1978 | Sakamoto | 358/80 |
| 4,194,221 | 3/1980 | Stoffel | 358/283 |
| 4,251,837 | 2/1981 | Janeway, III | 358/283 |
| 4,288,821 | 9/1981 | Lavallee et al. | 358/283 |
| 4,485,408 | 11/1984 | Kamizyo et al. | 358/283 |
| 4,495,522 | 1/1985 | Matsunawa et al. | 358/283 |
| 4,517,605 | 5/1985 | Yokomizo | 358/283 |
| 4,547,811 | 10/1985 | Ochi et al. | 358/283 |
| 4,554,593 | 11/1985 | Fox et al. | 358/284 |
| 4,556,916 | 12/1985 | Matsunawa | 358/283 |
| 4,586,089 | 4/1986 | Nakazato et al. | 358/284 |

FOREIGN PATENT DOCUMENTS

| | | |
|---|---|---|
| 0074794 | 3/1983 | European Pat. Off. . |
| 3207079 | 9/1982 | Fed. Rep. of Germany . |
| 3225415 | 2/1983 | Fed. Rep. of Germany . |
| 3226034 | 2/1983 | Fed. Rep. of Germany . |
| 66174 | 5/1980 | Japan ................... 358/283 |
| 125580 | 8/1982 | Japan . |
| 147376 | 9/1982 | Japan ................... 358/283 |
| 3374 | 1/1983 | Japan . |
| 142676 | 8/1983 | Japan ................... 358/75 |
| 153455 | 9/1983 | Japan ................... 358/283 |

OTHER PUBLICATIONS

Schindler, H. R., et al., "Optical Scanning of Continuous-Tone and Line Documents with Spatial Frequency Separation for Improved Data Handling and Compaction", IBM Technical Disclosure Bulletin, vol. 20, No. 12, May 1978, pp. 5416-5421.

Brandley, C. R., "Pseudo-Halftone Generation", IBM Technical Disclosure Bulletin, vol. 20, No. 4, Sep. 1977.

Primary Examiner—James J. Groody
Assistant Examiner—Randall S. Svihla
Attorney, Agent, or Firm—Oblon, Fisher, Spivak, McClelland & Maier

[57] ABSTRACT

A picture signal processing circuit for use in a picture reproducing apparatus, wherein a picture to be copied is optically scanned by a line image sensor to provide picture signals for each of the plural picture elements of the picture. A detector circuit is arranged to detect a local variation in the density of the picture based on a convolution operation on picture signals of a two-dimensional picture-element array to produce a local density variation detection signal which represents a high frequency component of the input signal. The picture-element array being detected is shifted by one picture element in a scanning direction during optical scanning of the picture. A signal processor circuit is responsive to the local density variation detection signal to switch between a simple binarization processing using single threshold data and a dithering binarization processing using dither matrix threshold data for the picture signal to be applied to a printer. With this arrangement, line pictures, character pictures or the like are reproduced with binary signals and continuous tone pictures are reproduced with dithered signals.

15 Claims, 27 Drawing Figures

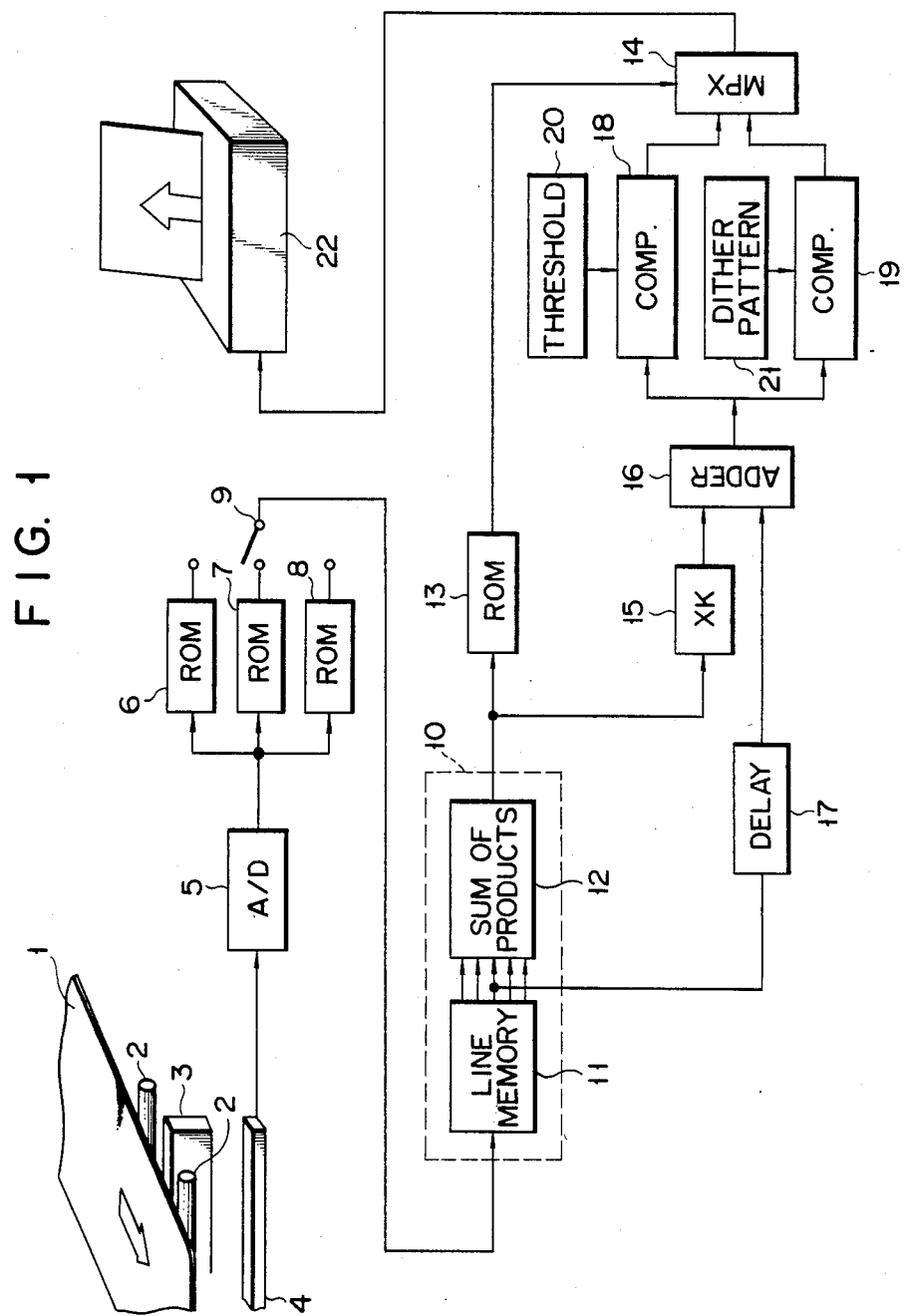
F I G. 1

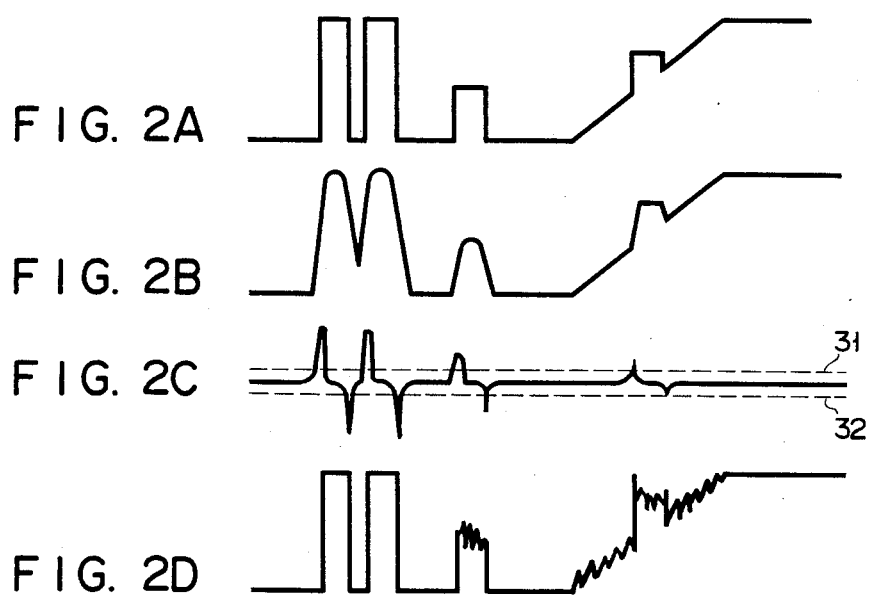

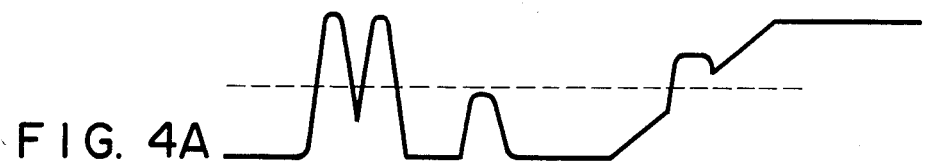
FIG. 4A
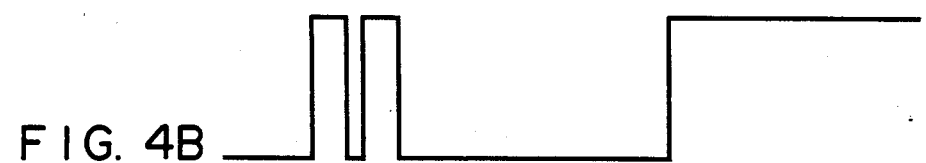
FIG. 4B
FIG. 4C
FIG. 5
| a1 | a2 | a3 | a4 | a5 |
|----|----|----|----|----|
| b1 | b2 | b3 | b4 | b5 |
| c1 | c2 | c3 | c4 | c5 |
| b1 | b2 | b3 | b4 | b5 |
| a1 | a2 | a3 | a4 | a5 |

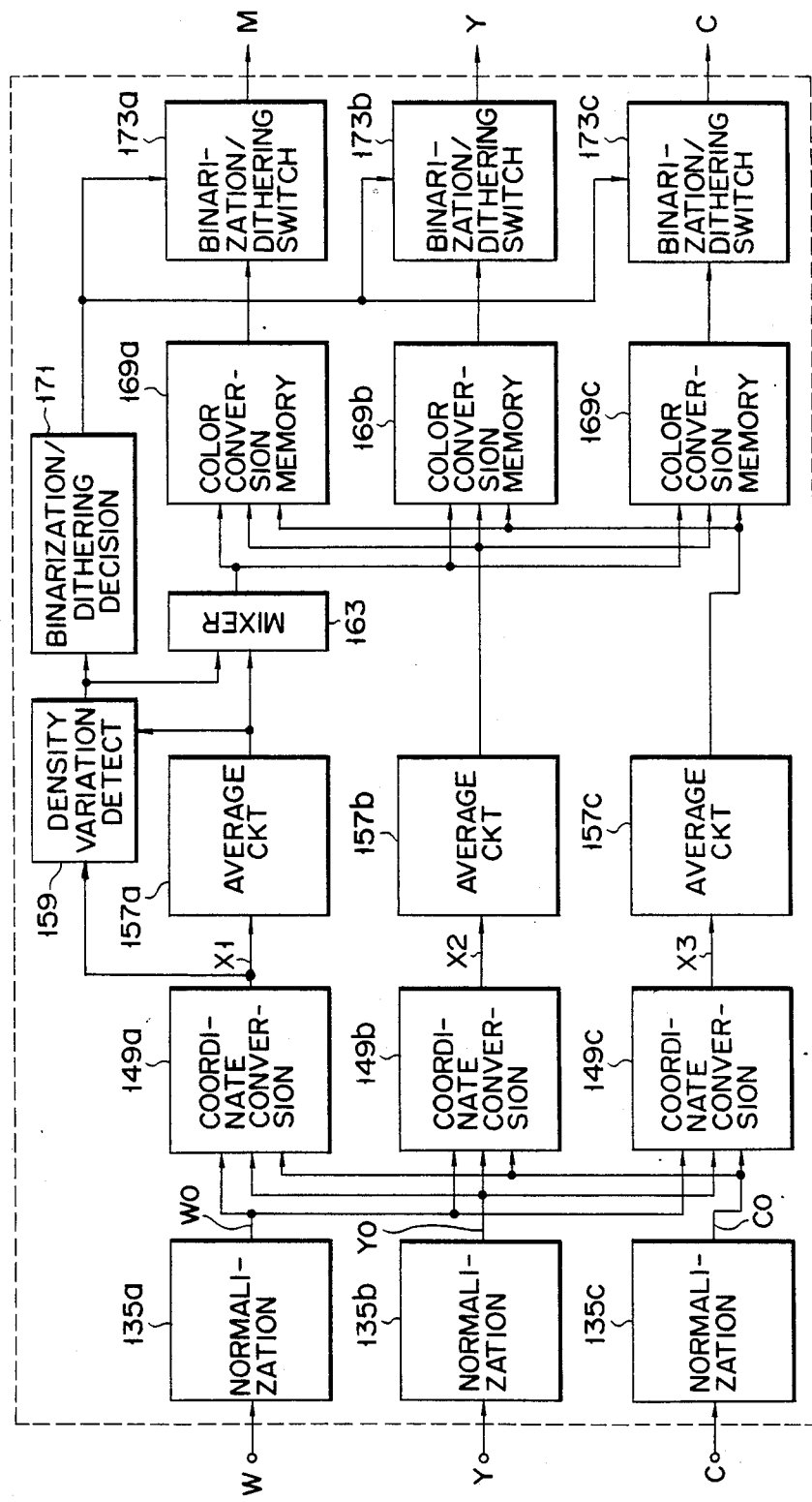
F I G. 12

FIG. 18
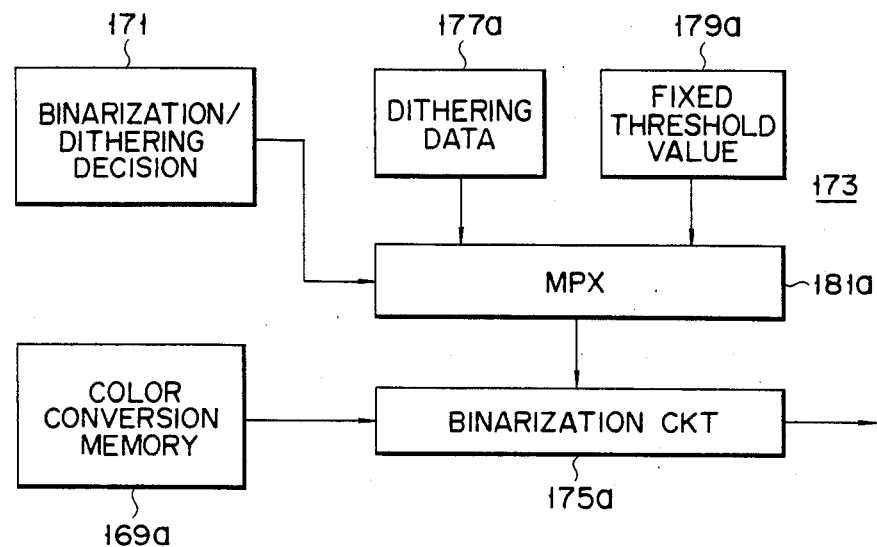
FIG. 19
| 1 | 9 | 3 | 11 |
|---|---|---|----|
| 13 | 5 | 15 | 7 |
| 4 | 12 | 2 | 10 |
| 16 | 8 | 14 | 6 |
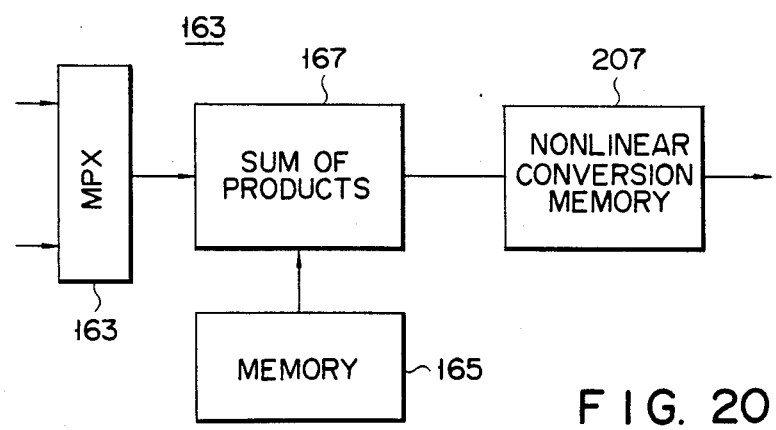
FIG. 20

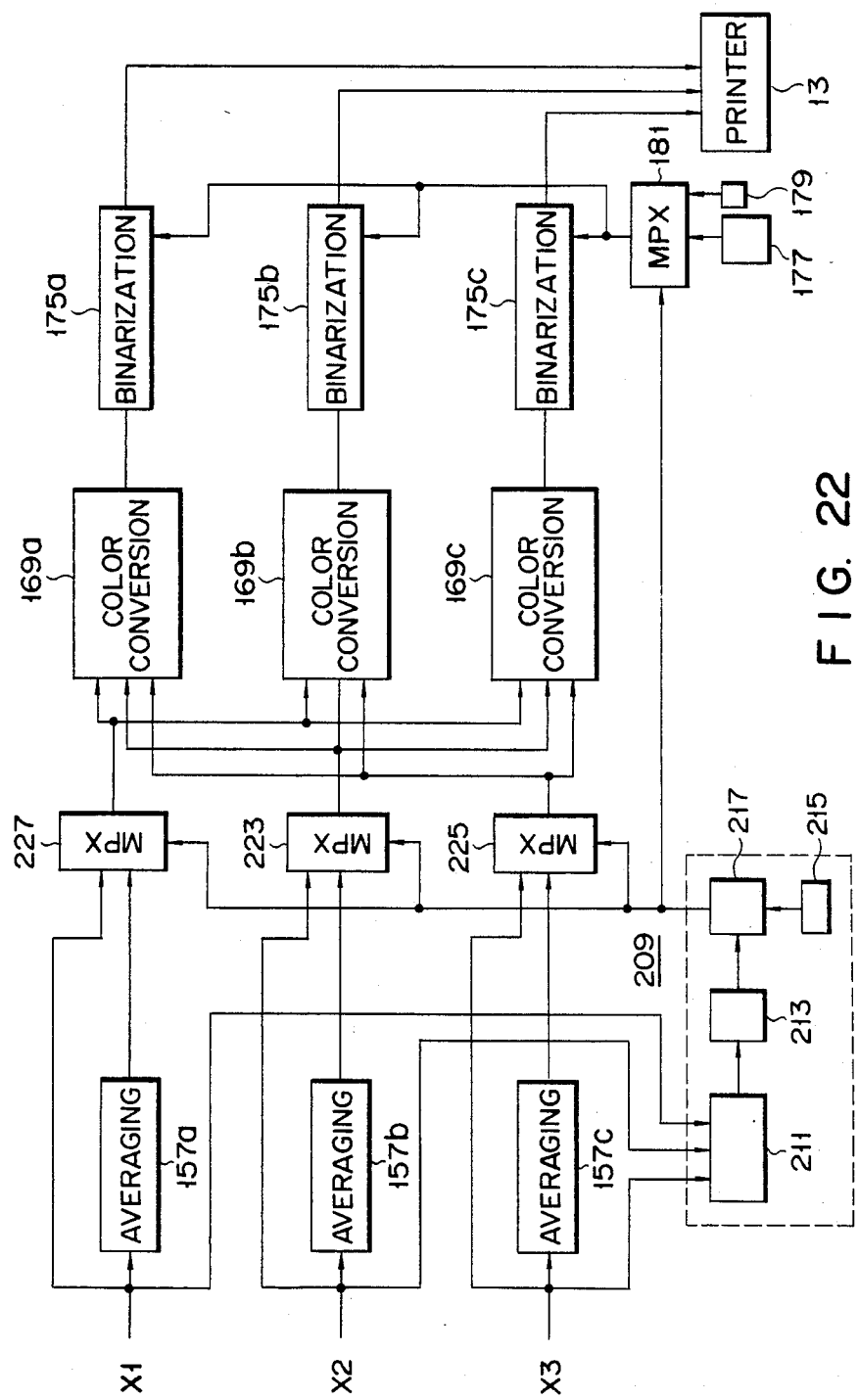
F I G. 22

4,663,662

PICTURE SIGNAL PROCESSING SYSTEM FEATURING SIMPLE OR DITHERING BINARIZATION PROCESSING SELECTED IN RESPONSE TO LOCAL VARIATIONS IN PICTURE DENSITY

BACKGROUND OF THE INVENTION

The present invention relates to a picture signal processing system and, more particularly, to a picture signal processing system suitable for reproducing continuous tone pictures.

The display or reproduction of bi-level pictures is most stable for display devices such as a thermal printer and a liquid crystal display. To display or reproduce an ordinary picture including a continuous tone picture such as a photograph by these devices, a continuous tone display system using a dithering method is well known. According to the dithering method, a threshold value for bi-level quantization is fluctuated in accordance with a random or pseudo-random function during the process of quantizing a continuous tone picture signal to two values. In the case of this dithering method, however, the reproduction resolution is reduced and irregular noises are caused when the picture is reproduced in various tones.

A color printer using a color image sensor of the spatially divided type is well known. With such a color printer when a printed document having characters and a continuous tone color picture is copied, dots forming the continuous tone color picture are outputed as noise to thereby prevent the colors of the picture from being faithfully reproduced. In order to reduce or eliminate noise, the picture may be blurred by an optical system. When it is done so, however, even the characters are blurred, thus adversely affecting the reproduction of the characters. Blurred picture can also be obtained by an electrical process of averaging picture signals, with the result that small characters cannot be displayed.

SUMMARY OF THE INVENTION

An object of the present invention is to provide a picture information signal processing system suitable for a high-resolution and continuous-tone picture reproduction.

Another object of the present invention is to provide a picture signal processing system arranged to reproduce a continuous tone color picture without being influenced by pattern noise resulting from dots forming the continuous tone color picture.

According to the present invention, a local fluctuation in the density of an input picture is obtained on the basis of a picture information signal so as to reproduce the continuous tone picture. When the local fluctuation is larger than a predetermined value, bi-level picture information signals are supplied to a picture output device and, when smaller, dithered picture information signals are supplied to the picture output device.

When a continuous tone color picture is formed of dots, a process of averaging color information signals is carried out so that bi-level or dithered signals of the averaged color information signals are supplied to the picture output device.

BRIEF DESCRIPTION OF THE DRAWINGS

FIG. 1 is a schematic block diagram of a picture signal processing system embodying the present invention;

FIGS. 2A through 2D show waveforms to explain the picture signal processing according to the present invention;

FIG. 3 shows the content of a ROM for generating a signal to select binarization or dithering processing of the picture information signal shown in FIG. 1;

FIGS. 4A to 4C are diagrams to explain a picture processing based solely on a simple binarization method and another picture processing based solely on a dithering method;

FIG. 5 shows matrix coefficients for convolution operation on the picture signals adapted to produce high-frequency components;

FIG. 12 is a block diagram of the picture signal processing system shown in FIG. 10;

FIG. 18 shows the binarization/dithering processing switch circuit of FIG. 12;

FIG. 19 shows a reference data pattern employed in the dithering reference data memory shown in FIG. 18;

FIG. 20 shows an example wherein a nonlinear conversion memory is connected to the mixer circuit of FIG. 12 to reduce the number of bits of a picture signal;

FIG. 22 shows a further example of picture signal processing system shown in FIG. 10.

DETAILED DESCRIPTION OF THE PREFERRED EMBODIMENTS

Figure 6:
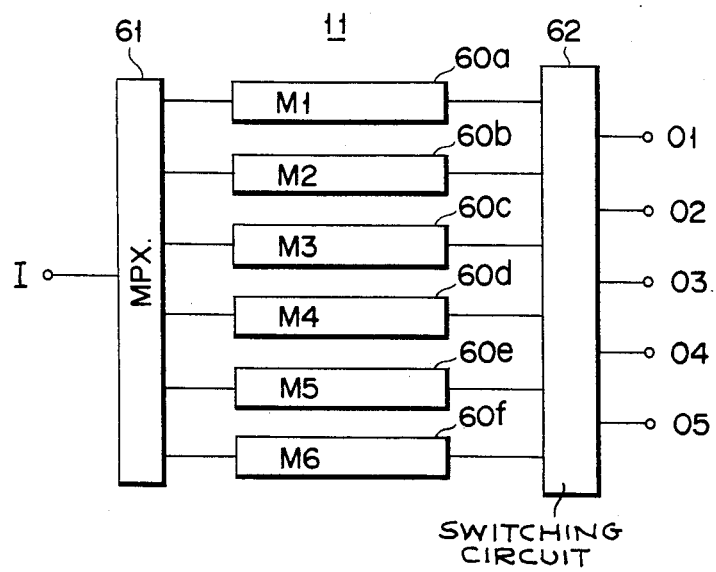
FIG. 6 shows a schematic arrangement of the line memory shown in FIG. 1.

In FIG. 1 in which a basic arrangement of a picture signal processing system according to the present invention is shown, a document 1 is illuminated by a linear light source 2 such as a fluorescent lamp and a picture on the document 1 is imaged on a one-dimensional image sensor 4, which has CCD chips, by means of a self-focusing rod-lens array 3 which is well known as "SELFOC" (Trademark). The document 1 and the optical scanning system are moved relative to each other. The optical scanning system is usually moved relative to the document 1. Picture signals are read out of the sensor 4 in a serial form and each signal is converted by an A/D converter 5 to a digital signal of eight bits, for example. The digital picture signal is applied commonly to density conversion ROMs 6, 7 and 8 provided for adapting density characteristic of the document to the density output characteristic of a display printer 22. Density conversion tables corresponding to dark, faint and flat pictures, respectively, are stored in the ROMs 6, 7 and 8. The ROMs 6, 7 and 8 are accessed by a digital picture signal from the A/D converter 5 to read out a corresponding density-converted picture signal. One of the ROMs 6, 7 and 8 is selected by a switch 9 in accordance with the density characteristics of the document 1. An output signal read out of the selected ROM is applied to a differentiating circuit 10, which generates an output signal (digital) having such a magnitude as corresponds to a local variation in the density of the document 1. The output signal is used, as will be described later, for switching between simple two-level reproduction and dithered reproduction of the pictures signals.

The differentiating circuit 10 is arranged to perform a second-order differentiation of the picture signals using a convolution operation. The differentiating circuit 10 comprises a line memory section 11 for preparing two-dimensional picture data corresponding to a two-dimensional picture element array of a predetermined size from one-dimensional input signals, and a sum-of-products operation section 12 for differentiating the two-dimensional data to produce output signals representing high-frequency components of the picture.

The operation of the differentiating circuit 10 will be described taking an example of one-dimensional input signals.

When an input picture has such brightness levels as shown in FIG. 2A, an electrical signal shown in FIG. 2B is obtained from the sensor 4 through the optical system which has transmission characteristics of the rod-lens array 3 and the like. When this electrical signal is applied to the differentiating circuit 10, a differentiated signal shown in FIG. 2C is obtained which represents a high-frequency component of the picture. This differentiated signal is shown in an analog form in FIG. 2C but is practically obtained as a 8-bit digital signal.

The output signal of the differentiating circuit 10 is applied to a simple binarization/dithering reproduction switching code generator section (ROM) 13. This switching code generator section 13 generates a first code signal "0" to select the simple binarization processing of picture using a fixed threshold value, when the input signal shown in FIG. 2C has a level larger than a level designated by a broken line 31 or smaller than a level designated by a broken line 32. On the other hand, when the level of the input signal is betwen the broken lines 31 and 32, a second code signal "1" is generated to select such systematic dithering processing of picture as will be described later. The switching code generator section 13 comprises a ROM, whose content may be determined as shown in FIG. 3. Namely, this ROM is accessed by the differentiated signal to generate a binary signal corresponding to the level of the differentiated signal. Namely, according to this invention, the local variation in the density of the input document is detected by the differentiating circuit 10 and when the density variation exceeds the predetermined level, the switching code generator section 13 generates the code signal for selecting simple binarization processing of picture signals, while when the density variation is lower than the predetermined level, the code signal for selecting dithering processing of picture signals. The code signal is applied to a multiplexer 14 to select simple bi-level quantized or dithered picture signal.

A signal on the same line as the output signal of the sum-of-products operation section 12 is derived from the line memory section 11. The signal derived from the line memory section 11 is an output signal of the line sensor 4 as shown in FIG. 2B. This signal is subjected to the simple binarization or dithered binarization processing.

The degradation of high-frequency components of the picture signals cannot be avoided due to transfer characteristics of the optical system including the rod-lens array 3. In order to obtain a high-resolution output picture, therefore, it is preferable that the output signal of the line memory section 11 is subjected to a high-frequency component emphasizing processing by an output signal of the operation circuit 12 which corresponds to the high-frequency components of the picture. Since over-correction brings about a degradation of picture quality, a correcting coefficient K is selected between 0 and 1.

Therefore, the output signal of the sum-of-products operation section 12 is multiplied by the correcting coefficient K in a multiplier 15 and applied to an adder 16. Time delay is caused in the sum-of-products operation section 12 due to its operation process, so that the output signal of the line memory 11 is supplied to the adder 16 through a delay circuit 17. When the correcting coefficient K is $\frac{1}{2}^n$ (n represents an integer), the multiplier 15 can be omitted in such a way that the output signal of the sum-of-products operation circuit 12 is added to the corresponding lower significant bits of the output signal of the line memory 11.

An output signal of the adder 16 is applied to comparators 18 and 19. Picture signals from the adder 16 are compared in the comparator 18 with a fixed threshold value stored in a memory 20 to perform simple binarization processing of the picture signals. On the other hand, the output signals of the adder 16 are compared, for each picture element, in the comparator 19 with a systematic dithering pattern data stored in a memory 21 to obtain dithered binary picture signals.

Output signals of the comparators 18 and 19 are applied to the selector 14, which is responsive to the selection signal from the ROM 13 to select either of simple binary picture signals or dithered binary picture signals according to the local density variation of the document, the selected picture signal being fed to printer 22.

According to the picture signal processing system as described above, an output picture shown in FIG. 2D can be obtained from an input picture shown in FIG. 2A.

In order to better understand the advantage of the system of the present invention, examples of simple bi-level picture and dithered bi-level picture are shown in FIG. 4. FIG. 4A shows a picture signal obtained from the line sensor. An output picture as shown in FIG. 4B is obtained from the picture signal by the simple binarization process and, an output picture as shown in FIG. 4C is obtained by the dithered binarization process. According to the present invention as shown in FIG. 2D, portions which have a high local density variation (or high-frequency components of the picture signal) are reproduced as two-level pictures and portions which have a low local density variation (or low-frequency components of the picture signal) are reproduced as a dithered picture. Therefore, pictures can be reproduced with a high resolution and continuous tone picture can be effectively reproduced.

The differentiating circuit 10 will be described. Irregularity in sensitivity is found among sensing elements or CCD cells of the CCD line sensor 4. When the high-frequency emphasis is performed in the line direction in which the CCD cells are arranged, therefore, the irregularity in sensitivity of the sensing elements will be further enhanced. However, no variation in the sensor output signal is caused in a direction perpendicular to the line sensor, that is, in a direction in which the document is fed or the line sensor is moved. Therefore, a great emphasis of the high-frequency components is possible in the direction perpendicular to the line direction.

It is, therefore, practically preferable that the degree to which the high-frequency components are emphasized is made different in the direction perpendicular to the line direction. FIG. 5 shows a matrix of parameters for high-frequency emphasis, in which the same parameters are alotted to the first and fifth rows and the same parameters are also alotted to the second and fourth rows. Each of the parameters $a_1$ to $c_5$ corresponds to a picture element. A picture signal of each of the picture elements in the 5×5 picture elements array is multiplied by its corresponding parameter to obtain a product and the resultant products are added together to perform a convolution operation. Picture element signals on five scanning lines on the document are simultaneously needed to prepare picture element data for 5×5 picture elements array.

5×5 picture elements signals are prepared by the line memory section 11. As shown in FIG. 6, the line memory section 11 includes six line memories $60a$ to $60f$ and a multiplexer 61 and a switching circuit 62 arranged at inputs and outputs of the line memories, respectively. The multiplexer 61 selects one of the line memories $60a$ to $60f$ successively and picture signals on a scanning line are written into the selected line memory from an input terminal I. Picture signals are simultaneously read out from remaining five line memories to the output terminals $O_1$ to $O_5$ through the switching circuit 62. Every time when one picture element signal is written into a selected line memory, five picture element signals on the five scanning lines are simultaneously read out from the remaining five line memories, and five consecutive picture element signals on a scanning line are successively read out from each of the line memories.

Figure 7:
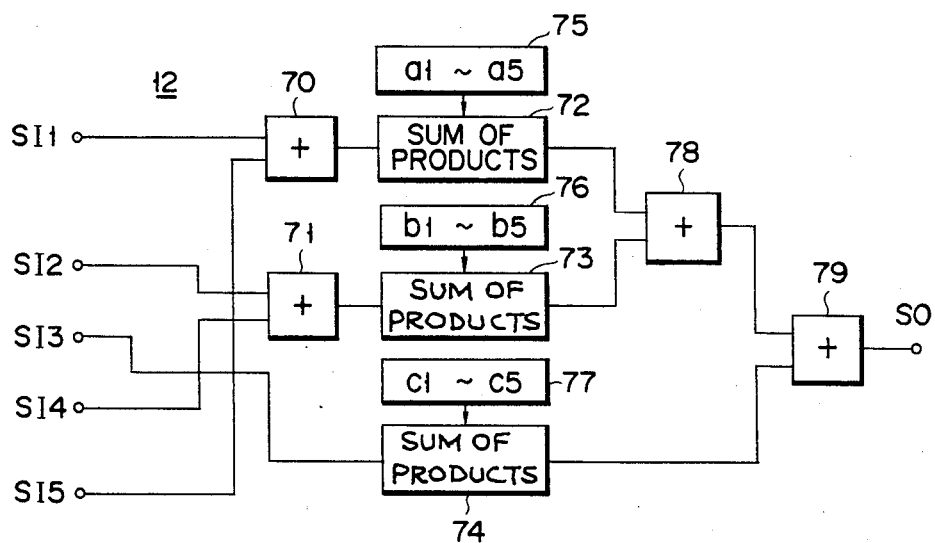
FIG. 7 shows the sum-of-products operation circuit of FIG. 1 for performing the convolution operation.

The output terminals $O_1$ to $O_5$ receive picture signals from five line memories, respectively, in the order of storage. The outputs $O_1$ to $O_5$ of the line memory section 11 are connected to inputs $SI_1$ to $SI_5$ of the sum-of-products operation section 12 shown in FIG. 7.

Picture element signals applied to the inputs $SI_1$ and $SI_5$ of the sum-of-products operation section 12 are applied via an adder 70 to a sum-of-products operation circuit 72 where they are multiplied by a corresponding one of parameters $a_1$ to $a_5$ applied from a parameter memory 75, and the products resulting from these multiplications are added together. Picture element signals applied to the input $SI_2$ and $SI_4$ are applied via an adder 71 to a sum-of-products operation circuit 73 where they are multiplied by a corresponding one of parameters $b_1$ to $b_5$ applied from a parameter memory 76, and the products resulting from these multiplications are added together. Picture element signals applied to the input $SI_3$ are supplied to a sum-of-products operation circuit 74 where they are multiplied by a corresponding one of parameters $c_1$ to $c_5$ applied from a parameter memory 77, and the products resulting from these multiplications are added together. The outputs of the sum-of-products operation circuits 72 to 74 are connected to an output $S_n$ via adders 78 and 79. A high-frequency component signal, namely, a differentiated signal is obtained at the output $S_0$.

A picture signal processing system for color picture reproduction will be described.

Figure 8:
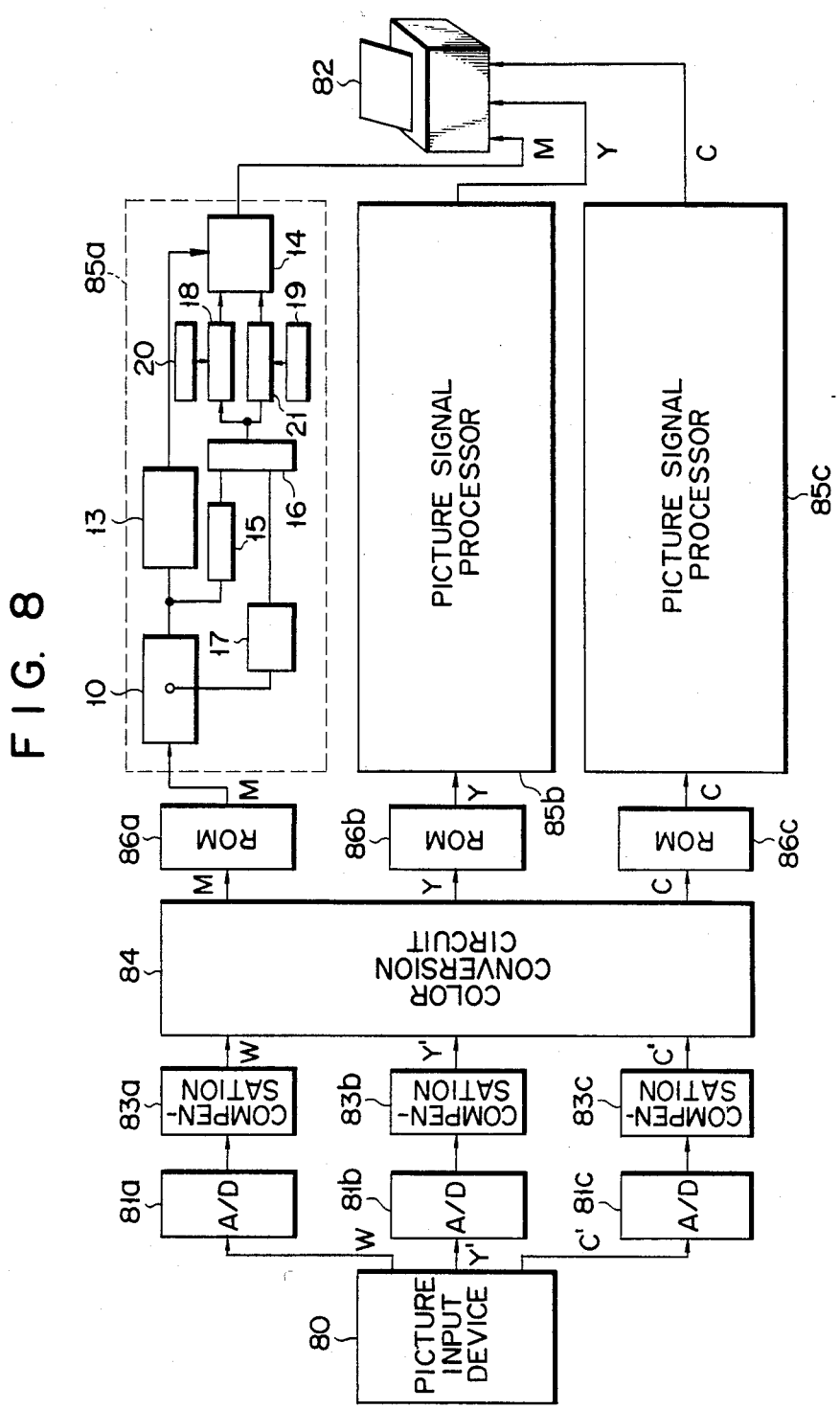
FIG. 8 shows a color picture signal processing system according to another embodiment of the present invention.

As shown in FIG. 8, separate color signals W, Y' and C' representing white, yellow and cyan picture components, respectively, are provided by a color document input device 80. The signals W, Y' and C' are converted to digital signals by A/D converters $81a$, $81b$ and $81c$. These digital signals are supplied to a color conversion matrix circuit 84 through compensation circuits $83a$, $83b$ and $83c$ which serve to adapt input and output characteristics of the input device 80 for density characteristics of three color inks used in a color printer 82. The matrix circuit 84 converts the picture signals W, Y' and C' to color signals M, Y and C according to spectral characteristics of magenta, yellow and cyan inks used in the color printer 82 to print an output picture. The color printing signals M, Y and C are supplied to picture signal processing circuits $85a$, $85b$ and $85c$, respectively, and are subjected to simple binarization or dithered binarization processing. The picture signal processing circuits have an arrangement identical to that in the above-described embodiment shown in FIG. 1. The color picture signals which have been processed as described above are applied to the color printer 82 so that a color picture having continuous tones can be obtained with a high resolution. The block diagram shown in the picture signal processing circuit $85a$ is the same as the processing circuit shown in FIG. 1 and corresponding blocks are represented by the same reference numerals. Since the color signals are independently subjected to the picture processing of the present invention in this embodiment, fine adjustment of colors is made possible. In a case where a color input document having a poor contrast and stains on a white background of the document is to be treated, circuits $86a$, $86b$ and $86c$ similar in function to the ROMs 6, 7 and 8 shown in FIG. 1 may be arranged at the output side of the color conversion matrix circuit 84.

A further embodiment of color picture reproducing apparatus will be described referring to FIG. 9. This embodiment is designed to simplify its arrangement.

Like the above-described embodiment, the separate color signals W, Y' and C' from the input device 80 are converted to digital signals by the A/D converters $81a$, $81b$ and $81c$, respectively. These digital signals are applied to logarithmic conversion ROMs $90a$, $90b$ and $90c$ to reduce the number of bits of the digital signal. The logarithmic-converted digital signals are applied to a color conversion circuit 91, which provides signals M, Y and C. The color conversion circuit 91 comprises a RAM (random access memory) in which a color conversion table formed according to gradations of color which can be reproduced by the color printer is stored. Namely, all colors which can be reproduced by the printer are previously known, and thus a color conversion table for converting the color signals W, Y' and C' to the color signals M, Y and C is prepared. The bit number of the digital signals W, Y' and C' which access the RAM which stores the conversion table may be smaller than in the embodiment shown in FIG. 8. Since the color conversion circuit 91 comprises the RAM, the content of the color conversion table can be changed. This embodiment is provided with a ROM 92 for changing the content of the color conversion table. As in a case where a color input document has a poor contrast or a high density background, a proper color conversion is made possible by this ROM 92, as desired according to the characteristics of the document.

In this embodiment, the selection of the simple binarization or dithered binarization processing of picture signals is made only on the basis of the picture signal W representing the brightness component of the color picture. The signal W is also subjected to the simple binarization and dithered binarization processings.

The signal W is supplied to a picture signal processing circuit 93 after A/D conversion. This circuit 93 is the same as that of FIG. 1 and like blocks are designated by like numerals.

The output signals M, Y and C of the color conversion circuit 91 are delayed by delay circuits 94a, 94b and 94c correspondingly to a delay caused by the convolution operation in the processing circuit 93, and then subjected to simple and dithered binarization processing. Numerals 95a, 95b and 95c represent circuits for simple binarization processing of the signals M, Y and C, respectively, and numerals 96a, 96b and 96c comparators for dithered binarization processing. Numerals 97a, 97b and 97c denote dithering matrix data memories for the comparators 96a, 96b and 96c, respectively. The simple binary signal and the dithered binary signal of the signal M are applied to a multiplexer 98a. The simple binary signal and the dithered binary signal of the signal Y are applied to a multiplexer 98b. The like signals of the signal C are applied to a multiplexer 98c. In response to a switchover signal of "1" or "0" from the ROM 13 in the picture signal processing circuit 93, the multiplexers 98a, 98b and 98c select one of the simple and dithered binary signals to feed corresponding gate circuits 99a, 99b and 99c. An output signal of the multiplexer 14 which selects one of the simple and dithered binary signals of the signal W is applied to a gate circuit 99d.

When all of the outputs of the multiplexers 98a, 98b and 98c are "1" or "0", the color of picture is black or white. A conincidence detecting circuit 100 is provided on the output side of the multiplexers 98a, 98b and 98c to generate an output signal whose logical level is "1", when output levels of the multiplexers 98a, 98b and 98c coincide with one another. The gate circuit 99d is enabled by the detected signal of logical level 1 from the coincidence detecting circuit 100 to apply the signal W to a color printer 101. At this time the gate circuits 99a, 99b and 99c are disabled. When the output signal levels of the multiplexers 98a to 98c do not coincide with one another, the gate circuit 99d is disabled while the gate circuits 99a to 99c are enabled. Namely, only the signal W is applied to the color printer 101 for the black or white portion of picture, while only the signals M, Y and C are applied to the color printer 101 for the remaining portion of the picture.

In this embodiment, the emphasis of high-frequency components is carried out only with respect to the black and white portions of the picture, thus enabling an output picture with a distinct contour to be obtained. Due to binarization processing, line picture components of the picture can be reproduced with a high resolution even in color portions, and continuous tone color pictures can be pleasantly reproduced by dithered binarization processing.

Figure 9:
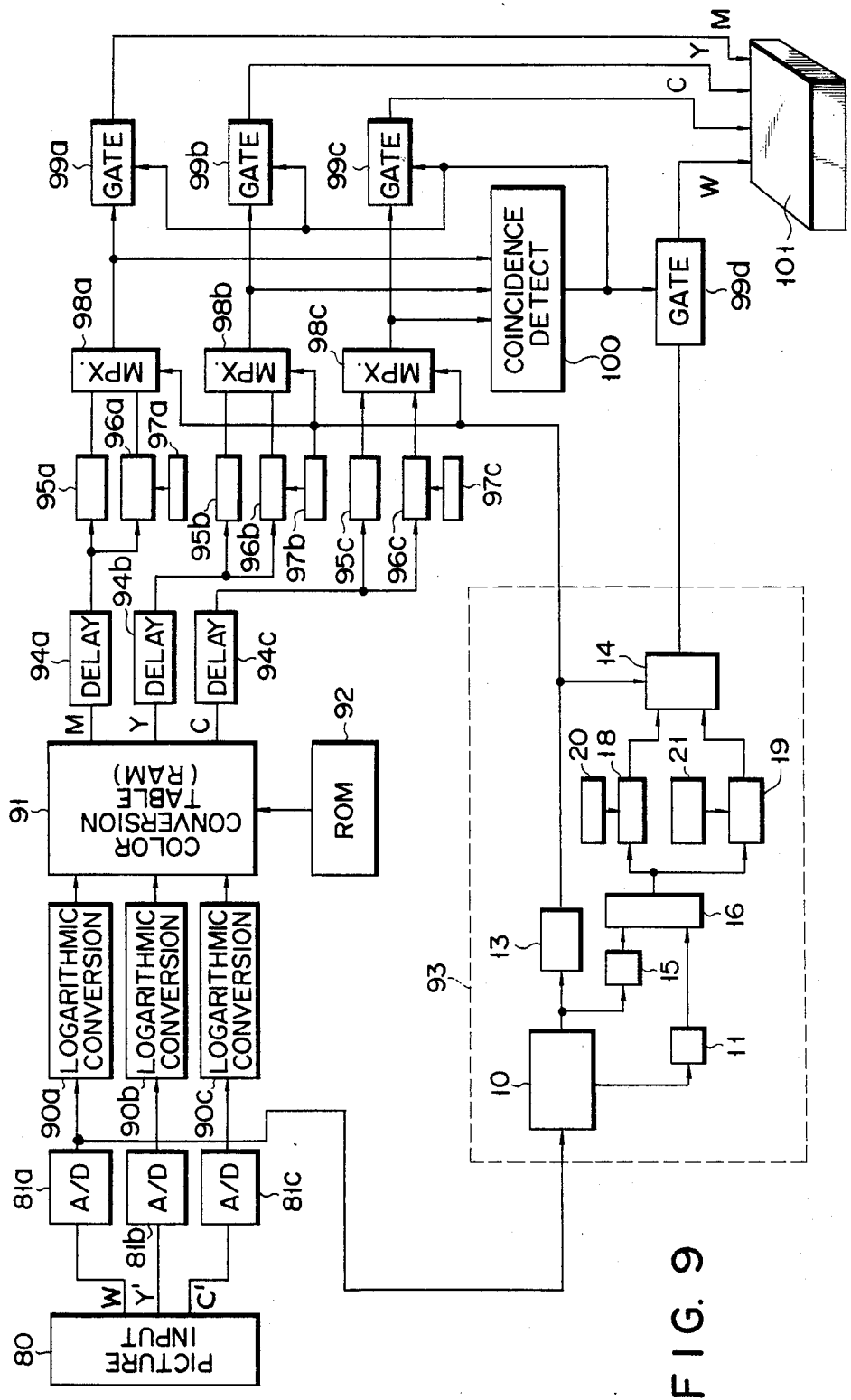
FIG. 9 shows a color picture signal processing system according to still another embodiment of the present invention.

The embodiment of FIG. 9 is arranged such that the signal W (black and white, or brightness signal) is applied to the color printer as required. However, this embodiment may be modified in such a way that the signal W is used only for detecting the local density variation and the color conversion circuit 91 provides a signal B (black) in addition to the signals M, Y and C. This signal B is also subjected to the simple and dithered binarization processings to be applied to the color printer.

A picture signal processing system of this invention will be described which is arranged to reduce pattern noises resulting from dots forming continuous tone picture portions of a color input document.

Figure 10:
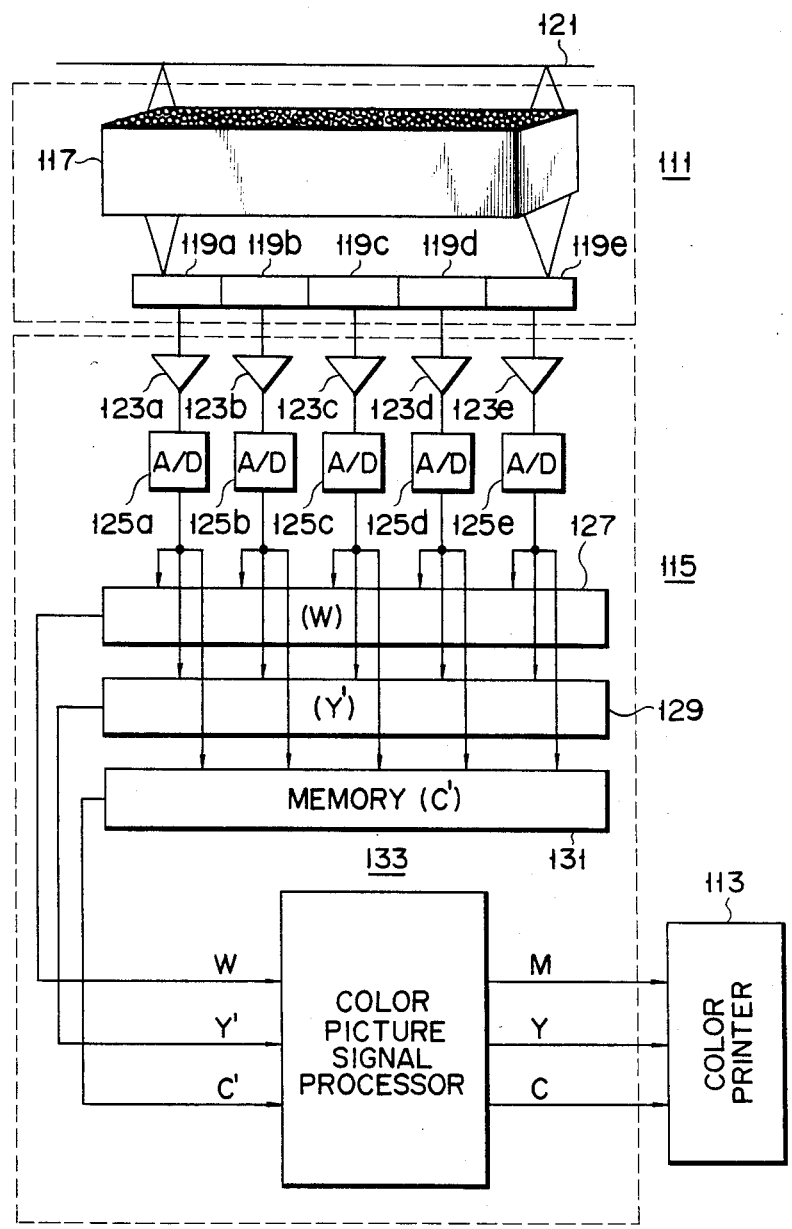
FIG. 10 shows an arrangement of a color thermal printer provided with a color picture signal processing system according to a still further embodiment of the present invention.

FIG. 10 shows a schematic arrangement of a color copying machine wherein a color document is read out by a plurality of CCD chips and a color picture is reproduced by the thermal printing method. This color copying machine comprises a contact-type image sensor section 111 which serves as a picture readout device, a color printer section 113, and a picture signal processing section 115 which processes picture signals from the image sensor section 111 in accordance with this invention.

Figure 11:
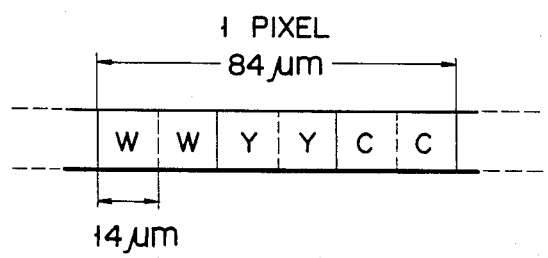
FIG. 11 shows an example of spatially divided type color line sensor employed in the apparatus of FIG. 10.

The sensor section 111 comprises an above-described self-focusing rod lens array, a plurality of CCD chips 119a to 119e arranged in the line direction of a document 121 to form a photosensor, and a light source (not shown) for illuminating the document 121. The photosensor is of the spatially divided type and six CCD cells, for example, form a picture element (84 μm) as shown in FIG. 11. Three pairs of CCD cells each consisting of two adjacent CCD cells have three-color filters W (white), Y (yellow) and C (cyan) thereon, respectively, as shown in FIG. 11. The three color filters may be of Y (yellow), G (green) and C (cyan).

Picture signals are read out serially from each of the CCD chips 119a to 119e and applied via amplifiers 123a to 123e to A/D converters 125a to 125e, respectively, to be converted to digital signals. Signals W, Y' and C' contained in an output signal of each of the A/D converters 125a to 125e are stored in memories 127, 129 and 131, respectively. It is preferable that each of memories 127, 129 and 131 has a capacity which corresponds to two scanning lines on the document 121. Picture signals read out of the memories 127, 129 and 131 are applied to a picture signal processing circuit 133 of the present invention. Output picture signals of the processing circuit 133 are applied to the color thermal printer 113 to form a color output picture by a color sequential system.

The picture signal processing circuit 133 of this embodiment will be described referring to FIG. 12.

The signals W, Y' and C' read out from the memories 127, 129 and 131 are applied to normalization circuits 135a, 135b and 135c, respectively. The normalization circuit has a function of eliminating or reducing moire noises which may be caused by a relationship between pitches of picture dots and photosensing elements of the photosensor, and a function of correcting the variation of sensitivity of the photosensing elements or the shading of the photosensor.

Figure 13:
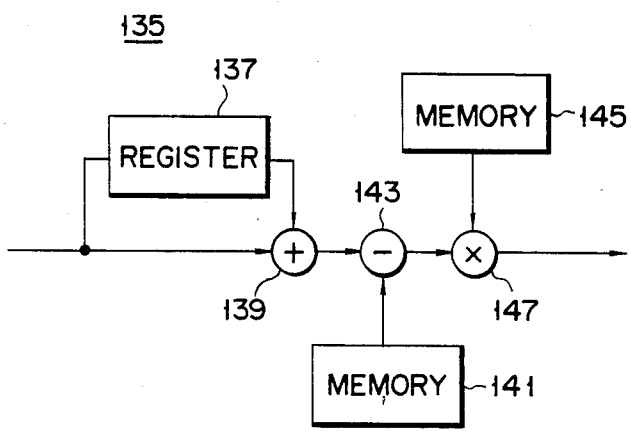
FIG. 13 shows the normalization circuit of FIG. 12.

Each of the normalization circuits 135a to 135c includes, as shown in FIG. 13, a register 137 for holding a picture signal detected by one CCD cell only for one clock time, and an adder 139 for adding together two picture signals detected by the two adjacent CCD cells having the same color filter. Bits of output signal of the adder 139 are shifted by one bit to LSB (least significant bit) side, so that the weight assigned to each bit of the output signal of the adder is halved and thus an arithmetical mean of two picture signals detected by the two adjacent CCD cells of the same filter color is obtained. This mean signal represents one of separate three color signals for one picture element. When moire components, opposite in sign and substantially the same in magnitude, are contained in output signals of the two adjacent CCD cells of the same filter color, they are almost cancelled out by the above-described adding process.

In order to achieve the second function of the normalization circuit, data stored in a coefficient memory 141 are subtracted in a subtracter 143 from the output signal of the adder 139, and the resultant of subtraction is further multiplied in a multiplier 147 by data stored in a coefficient memory 145. This is intended to obtain a normalized output signal $I_O$ from an output signal $I$ of a sensor element. The normalized output signal $I_O$ is calculated as follows:

$$I_O = (I - I_W) \times \frac{1}{I_B - I_W} \qquad (1)$$

wherein $I_W$ and $I_B$ represent white and black reference level signals obtained from standard white and black patterns of a standard test pattern document. In order to carry out this normalizing process for each of the picture elements of the image sensor, it is only required that $I_W$ and $I_B$ be previously found for each picture element using the standard test pattern, and the values of $I_W$ and $1/(I_B - I_W)$ be stored in memories 141 and 145 for each picture element, respectively, using a computer. The same process is carried out in the other normalization circuits 135b and 135c. In this way, an output signal having no irregularity in brightness caused by the sensitivity variation of the CCD sensor elements can be obtained. When a variation in characteristics of the color filters exists, however, it appears as a subtle color variation.

There are provided coordinate transforming circuits 149a, 149b and 149c to correct the subtle color variation caused by this characteristic variation of the color filters and also to reduce the capacity of color conversion table memories for obtaining the signals M, Y and C applied to the color printer.

Figure 14:
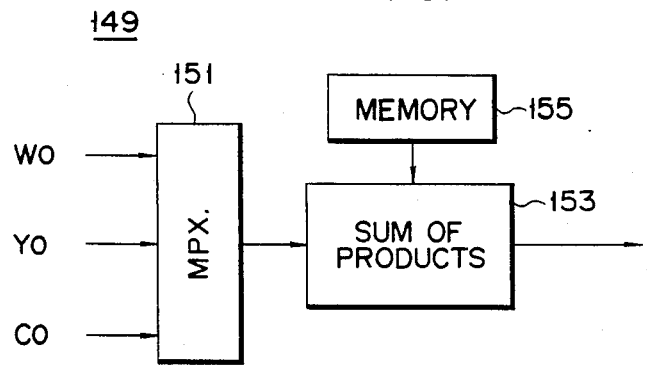
FIG. 14 shows the coordinate conversion circuit of FIG. 12.

An arrangement of the coordinate transforming circuits 149a to 149c is shown in FIG. 14. Normalized color signals $W_O$, $Y_O$ and $C_O$ from the nomalization circuits 135a to 135c are successively applied to a sum-of-products operation circuit 153 via a multiplexer 151. Predetermined coefficients are read out from a coefficient memory 155 and each of the normalized color signals $W_O$, $Y_O$, $C_O$ is multiplied by its corresponding coefficient in the sum-of-products operation circuit 153. Three products are added together to provide a coordinate transformed signal. Coefficient memories 155 for the coordinate transforming circuits 149a to 149c store different coefficients.

The coordinate transformation of the normalized color signals $W_O$, $C_O$ and $Y_O$ is intended to uniformly distribute, in an address space of color conversion table memories, address signals (coordinate-transformed signals) for accessing the color conversion table memories which provide the output signals M, C and Y. This is because, conversion matrix coefficients used in converting the normalized color signals $W_O$, $C_O$ and $Y_O$ to the output signals M, Y and C, become extremely approximate to one another. In other words, the output signals M, Y and C concentrate within a memory location of narrow region in the address represented by variables of $W_O$, $Y_O$ and $C_O$. Therefore, to precisely express each of the output signals W, Y, C necessitates large number of bits in the address signals $W_O$, $Y_O$, $C_O$, which results in the complication of the circuit arrangement. If the address signals of the color conversion table memory are uniformly distributed in the address space of this memory, the output signal can be easily represented, resulting in the simplification of the circuit arrangement.

Brightness signal $S_1$ and first and second color difference signals $S_2$ and $S_3$ are defined from the normalized picture signals $W_O$, $Y_O$ and $C_O$ as follows:

$$S_1 = Y_O + C_O - W_O$$

$$S_2 = W_O - Y_O$$

$$S_3 = W_O C_O \qquad (2)$$

$S_1$ may be $W_O$, which directly represents the brightness of the picture.

Equation (2) is expressed in a matrix form as follows:

$$\begin{pmatrix} S_1 \\ S_2 \\ S_3 \end{pmatrix} = \begin{pmatrix} -1 & 1 & 1 \\ 1 & -1 & 0 \\ 1 & 0 & -1 \end{pmatrix} \begin{pmatrix} W_O \\ Y_O \\ C_O \end{pmatrix} \qquad (3)$$

Coordinate transformation is then carried out according to a following equation:

$$\begin{pmatrix} X_1 \\ X_2 \\ X_3 \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} S_1 \\ S_2 \\ S_3 \end{pmatrix} \qquad (4)$$

Matrix coefficients aij are appropriately selected in such a way that each of the signals $X_1$, $X_2$ and $X_3$ is uniformly distributed in the address space of the color conversion table memory. Practically, $S_1$, $S_2$ and $S_3$ are measured from color signals obtained from each of the picture elements each of six CCD cells, and $X_1$, $X_2$ and $X_3$ are previously determined on the basis of $S_1$, $S_2$ and $S_3$ so that $X_1$, $X_2$ and $X_3$ are uniformly distributed in the address space of the color conversion table memory. Therefore, the matrix coefficients can be determined by an inverse matrix. For example, the matrix coefficients $a_{11}$, $a_{12}$, $a_{13}$ are determined by the measured values $S_1$, $S_2$ and $S_3$ and the previously determined value $X_1$. The matrix coefficients aij are obtained for each of picture elements. Even if the measured values $S_1$, $S_2$ and $S_3$ are different for each of the picture elements, therefore, $X_1$, $X_2$ and $X_3$ for different elements can be identified because the matrix coefficients for each picture element can be determined according to the measured values $S_1$, $S_2$, $S_3$ thereof. The coefficient memory 155 stores the matrix coefficients for each of picture elements, which are successively read out, using the computer, to perform coordinate transformation for each of picture elements, thus preventing hue variation of picture elements caused by the variation of picture elements caused by the variation in the color filter characteristics.

The following equation can be derived from equations (3) and (4):

$$\begin{pmatrix} X_1 \\ X_2 \\ X_3 \end{pmatrix} = \begin{pmatrix} -a_{11} + a_{12} + a_{13}a_{11} - a_{12}a_{11} - a_{13} \\ -a_{21} + a_{22} + a_{23}a_{21} - a_{22}a_{21} - a_{23} \\ -a_{31} + a_{32} + a_{33}a_{31} - a_{32}a_{31} - a_{33} \end{pmatrix} \begin{pmatrix} W_0 \\ Y_0 \\ C_0 \end{pmatrix} \quad (5)$$

Matrix coefficients in first, second and third rows of equation (5) are stored in the coefficient memories 155 for the coordinate conversion circuits 149a, 149b and 149c, respectively.

As shown in FIG. 2, one picture element is 84 μm in size and the number of picture elements to be displayed is approximately twelve per 1 mm in the case of color reproduction. One picture element is 28 μm in the case of black and white reproduction, corresponding to approximately 36 picture elements per 1 mm. When a photosensor having such a high resolution is employed, even clearance between dots of a printed color document is read out, causing dot noise in an output picture.

According to this invention, in order to faithfully reproduce a continuous tone picture and also to vividly reproduce characters and the like contained in picture, portions such as edges and lines in picture where the variation in density is large is reproduced by the normal two-level reproduction method, and the other portions by the dithering reproduction method.

In a case where a picture represented by dots is read out by the high resolution sensor, the picture reproduction will be achieved only by the simple binarization processing even if switching between simple and dithered binarizations processings is carried out with respect to the read out picture signals.

In the case of this embodiment, therefore, the switching between binarization and dithering reproductions is not based on a signal of each picture element, but it is based on an average value of signals of plural picture elements (e.g. 4×4 or 2×2 picture elements).

Accordingly, the output signals $X_1$ $X_2$ and $X_3$ of the coordinate transforming circuits 149a to 149c are applied to averaging circuits 157a to 157c, respectively. The density variation of the averaged brightness signal $X_1$ is used as a reference for switching between the binarization and dithering reproductions. Dot noise is eliminated by the averaging process. The switching between the binarization and dithering reproductions is carried out on the basis of the brightness signal from which dot noise has been eliminated, thus enabling a clear output picture to be obtained.

Figure 15:
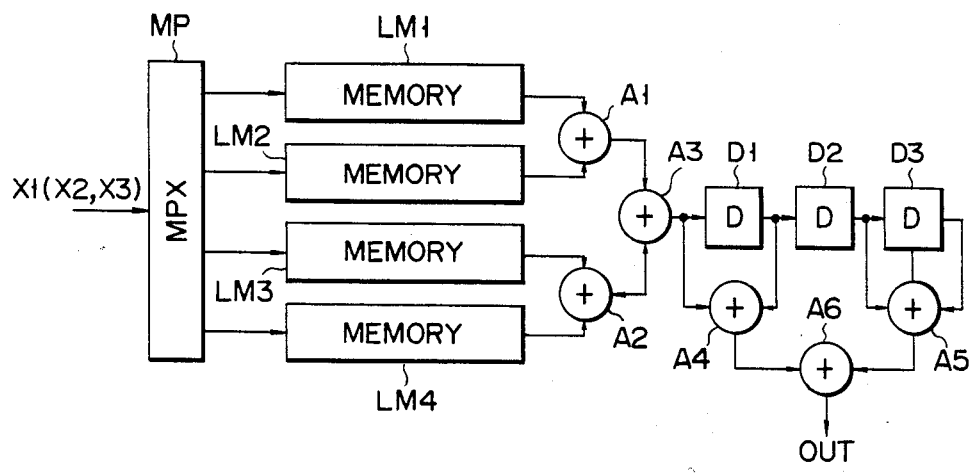
FIG. 15 shows the averaging circuit of FIG. 12.

Taking human's eyesight into consideration, 2 or 3 picture elements/mm will suffice as the resolution of output picture. Therefore, each of the averaging circuits 157a to 157c is enough to average sixteen signals which correspond to 4×4 picture elements. FIG. 15 show an arrangement of the averaging circuits. MP represents a multiplexer, $LM_1$ to $LM_4$ line memories each having the same capacity as the number of picture elements on one scanning line of the document $A_1$ to $A_6$ adders, and $D_1$ to $D_3$ delay circuits for delaying signals for one clock time required to transfer one picture element signal.

Figure 16:
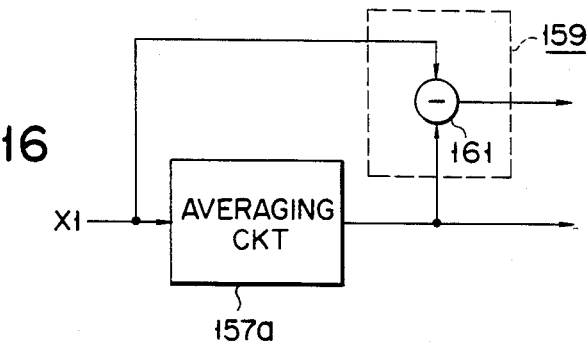
FIG. 16 shows the density variation detector circuit of FIG. 12.

FIG. 16 shows a circuit 159 for measuring the local variation of picture density. In this embodiment, the measuring circuit 159 includes a subtracter 161 for calculating the difference between input and output signals of the averaging circuit 157a. This subtracting process is a kind of differentiation, by which the local variation signal can be extremely easily obtained. Needless to say, the output signal of the averaging circuit 157a may be differentiated using the circuit shown in FIG. 1.

Figure 17:
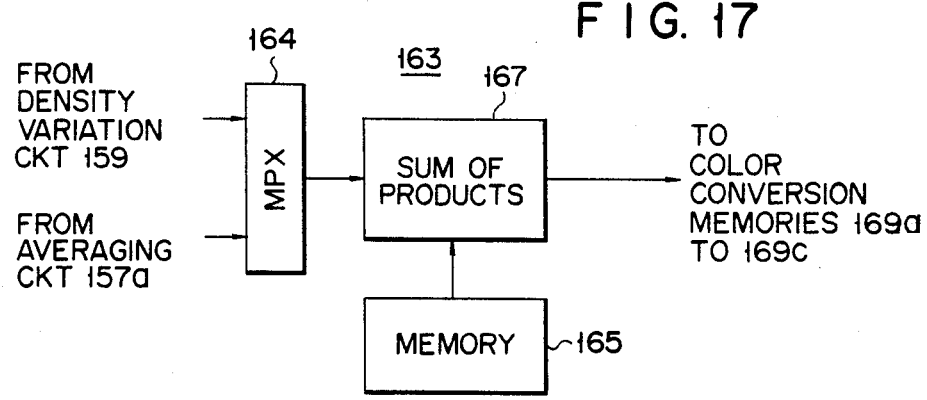
FIG. 17 shows the mixer circuit of FIG. 12.

Output signals of the averaging circuit 157a and subtracter 161 are mixed by a mixer circuit 163. In the mixer 163, as shown in FIG. 17, output signals of the averaging circuit 157a and subtracter 161 are successively applied to a sum-of-products operation circuit 167 via a multiplexer 164. The sum-of-products operation circuit 167 matrixes the two input signals, using coefficients stored in a coefficient memory 165, as follows:

$$y = a(X - \overline{X}) + b\overline{X} \quad (6)$$

wherein X represents an input signal of the averaging circuit 157a, $\overline{X}$ an averaged signal, and a and b matrix coefficients.

When a=b=1, y=X. When a=0 and b=1, y=$\overline{X}$. And when a=1 and b=0, y=X−$\overline{X}$. $\overline{X}$ is a signal in which high-frequency components have been removed and X−$\overline{X}$ a signal in which low-frequency components have been removed.

It will be understood, therefore, that the picture quality of output pictures can be made different from that of input pictures by changing the matrix coefficients. By way of example, when an input picture contains noise components a noise-suppressed but somewhat blurred output picture can be obtained by making the coefficient a small and the other coefficient b large. On the other hand, when an input picture is somewhat blurred, an output picture in which the contour of objects is emphasized can be obtained by making the coefficient a large and the other coefficient b small. It is desirable that the coefficients a and b can be changed from outside.

Output signals of the mixer 163 and averaging circuits 157b and 157c are inputed as address signals to color conversion memories 169a, 169b and 169c. Stored in the color conversion memories 169a, 169b and 169c are data on the respective amounts of the inks to print an output picture which are previously calculated according to Neugebauer's equation which is well known in the field of color production.

An output signal of the local density variation measuring circuit 159 is applied to a binarization/dithering decision section 171, which comprises a ROM, like the above-described embodiment shown in FIG. 3.

Output signals of the color conversion memories 169a, 169b and 169c are applied to binarization/dithering switching circuits 173a, 173b and 173c. As shown in FIG. 18, the switching circuit comprises a binarization circuit 175a for bi-level quantizing an output signal of the color conversion memory, a dithering reference data memory 177a, a fixed threshold value memory 179a and a multiplexer 181a for selectively connecting one of dithering reference data and fixed threshold value memories 177a and 179a to the binarization circuit 175a in response to the output of the binarization/dithering decision circuit 171. In the case of simple binarization processing, the binarization circuit 175a quantizes an input picture signal according to a fixed threshold value stored in the fixed threshold value memory 179a. In the case of dithering binarization processing, the input picture signal is quantized according to a threshold value set for each picture element of the predetermined picture element array and stored in the dithering reference data memory 177a. FIG. 19 shows a dithering reference pattern matrix for a 4×4 picture-element array. Sixteen picture elements are assigned with priority orders from 1 to 16. Each of picture signals for sixteen picture elements is dithered according to a threshold value which corresponds to the priority order assigned thereto.

Binary or dithered picture signals extracted from the binarization/dithering switching circuits 173a, 173b and 173c as described above are applied to a thermal head of the color thermal printer.

As described above, the coordinate transforming circuits 149a, 149b and 149c are provided so that their output signals $X_1$, $X_2$ and $X_3$ are adapted to uniformly distribute in address spaces of the color conversion memories 169a, 169b and 169c for producing the color signals M, Y and C. Even with such coordinate transforms, however, in the case of a high density (dark) color, it is difficult to distinguish the color signals M, Y, C. Dark colors are all converted to black. It is therefore desirable that a non-linear conversion such as a logarithmic conversion be applied to the brightness and color difference signals, particularly to the brightness signal. A logarithmic conversion memory 207 is provided on the output side of the mixer 163 for this purpose, as shown in FIG. 20. The output signal of the mixer 163 is applied to the memory 207 as an address signal. Stored in this memory 207 is a color conversion table whose output value remarkably increases as its input address value becomes great.

With the spatially divided type color sensor as shown in FIG. 11, when the color of a document changes abruptly within one picture element, the combination of output signals obtained from CCD cells corresponding to this picture element represents a tube color which is not present practically. Such a condition will happen at the edge of a character, for example. This also happens when the size of dots forming a picture is comparable with the size of photosensor elements or CCD cells. In the case of the latter, many false colors will be generated on a scanning line, raising a serious problem.

Figure 21:
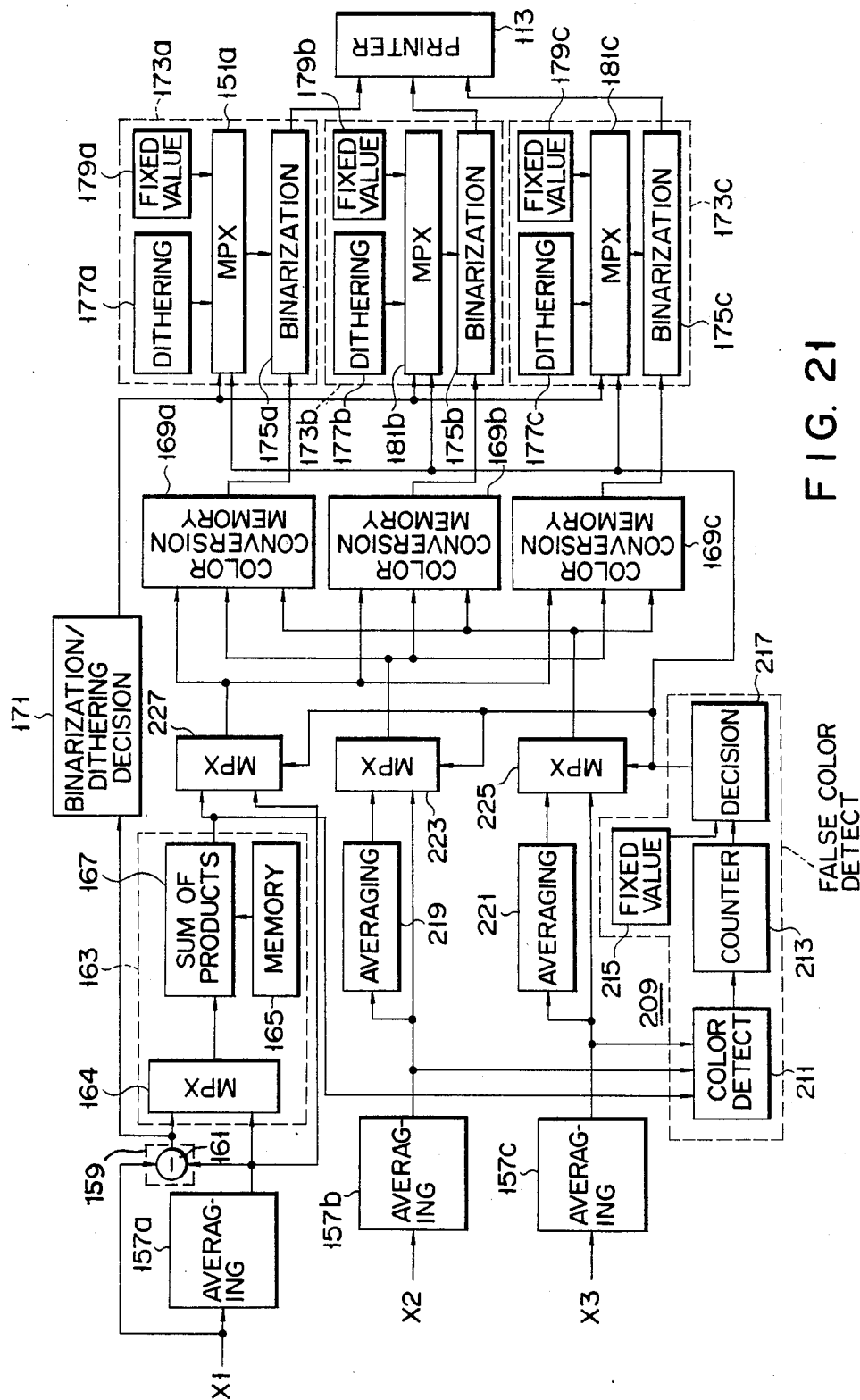
FIG. 21 shows another example of picture signal processing system shown in FIG. 10.

FIG. 21 shows an embodiment which is arranged to prevent the generation of such false colors. With this embodiment, when the number of generated false colors exceeds a predetermined number in a region of a predetermined number of picture elements, picture signals are averaged with respect to a larger region of picture elements.

In FIG. 21, brightness signal $X_1$ from the mixer 163 and color difference signals $X_2$ and $X_3$ from the average circuits 157b and 157c are applied to a false color detector circuit 209. The input signals $X_1$, $X_2$ and $X_3$ are input to a color detector circuit 211 in the false color detector circuit 209 where it is judged as to whether or not a color represented by the combination of the signals $X_1$, $X_2$ and $X_3$ is present practically. The detector circuit 211 is a memory having the same address space as those of the color conversion memories 169a, 169b and 169c but different in the content stored therein. The false color detector circuit 211 is a memory which stores "0" bits in memory locations that are addressed by the signals $X_1$, $X_2$ and $X_3$ when these signals represent colors which are present practically, i.e. are colors which can be reproduced by printer 113, and stores "1" bits in memory locations that are addressed by the signals $X_1$, $X_2$ and $X_3$ when these signals do not represent colors which are present practically i.e. are colors which cannot be reproduced by printer 113. Namely, in case of generation of a false color, the memory 211 generates the output "1" which is counted by a counter 213. The counter 213 counts the output "1" of the memory 213 for each predetermined picture region, that is, during the time a predetermined number of output signals are output from the averaging circuits 157a to 157c. The value counted by the counter 213 is compared with a threshold value, which is set by a threshold value circuit 215, by means of a decision circuit 217. When the count value is larger than the threshold value, the decision circuit 217 generates an output "1".

On the output side of the averaging circuits 157b and 157c are provided similar averaging circuits 219 and 221. A multiplexer 223 is connected to receive output signals of the averaging circuits 157b and 219. A multiplexer 225 is connected to receive output signals of the averaging circuits 157c and 221. Further, a multiplexer 227 is connected to receive output signals of the averaging circuit 157a and mixer circuit 163. These multiplexers 223, 225 and 227 are controlled by the decision circuit 217. More specifically, when the output of the decision circuit 217 is "0", the multiplexers 227, 223 and 225 select output signals of the averaging circuits 157a, 157b and 157c, respectively, and supply them to the color conversion memories 169a, 169c and 169c. On the other hand, when the output of the decision circuit 217 is "1", the multiplexers 227, 223 and 225 select output signals of the mixer circuit 163 and averaging circuits 219 and 221, respectively.

The output of the decision circuit 217 is also connected to multiplexers 181a, 181b and 181c of the binarization/dithering switching circuits 173a, 173b and 173c. Namely, when the output of the decision circuit 217 is "1", the multiplexers 181a, 181b and 181c select the dithered binarization processing of picture signals.

FIG. 22 shows an embodiment which is applied to an ordinary printed document other than photographs having binary pictures such as characters and lines, and a continuous tone picture formed by dot patterns. According to this embodiment, the dot patterns are reproduced by dithered binarization processing of averaged picture signals, and characters and lines by simple binarization processing of picture signals.

In FIG. 22, input signals of the averaging circuits 157a, 157b and 157c are applied to the false color detector circuit 211. When the output of the decision circuit 217 is "0", the multiplexers 227, 223 and 225 select outputs of the averaging circuits 157a, 157b and 157c, respectively, and connect them to the color conversion memories 169a, 169b and 169c. On the other hand, when the output of the decision circuit 217 is "1", the outputs of the averaging circuits 157a, 157b and 157c are selected. The multiplexer 181, dithering reference matrix memory 177 and fixed threshold value memory 179 are provided in common to the binarization circuits 175a, 175b and 175c for binarization of outputs of the color conversion memories 169a, 169b and 169c. When the output of the decision circuit 217 is "1", the multiplexer 181 connects the dithering reference matrix memory 177 to the binarization circuits 175a to 175c to dither output picture signals.

What is claimed is:

1. A picture signal processing system for use in a picture reproduction apparatus including picture input means for optically scanning, line by line, an input picture having picture elements and varying in density to obtain a picture input signal for each of the picture elements, and picture output means for reproducing the input picture, comprising:

detector circuit means connected to receive picture input signals corresponding to picture elements in a two-dimensional picture-element array having a predetermined number of picture elements, said picture-element array representing a portion of the input picture, said picture-element array successively shifting by one picture element in a scanning direction during the optical scanning of the input picture, for detecting a local variation in the density of the portion of the input picture represented by the picture-element array to generate a density variation detection signal; and processing circuit means connected to receive one of the picture input signals being received by said detector circuit means and responsive to the density variation detection signal for switching between a simple binarization processing using single threshold data and a dithering binarization processing using dithering matrix threshold data for processing the one picture input signal being received by said processing circuit means;

wherein said detector circuit means comprises:

means for producing the density variation detection signal based on carrying out a convolution operation of the picture signals corresponding to the picture elements in the picture-element array.

2. The picture signal processing system according to claim 1, wherein the density variation detection signal represents a high-frequency component of the input picture.

3. A picture signal processing system for use in a picture reproduction apparatus including picture input means for optically scanning, line by line, an input picture having picture elements and varying in density to obtain a picture input signal for each of said picture elements, and picture output means for reproducing the input picture, comprising:

detector circuit means connected to receive picture input signals corresponding to picture elements in a two-dimensional picture-element array having a predetermined number of picture elements, said picture element array successively shifting by one picture element in a scanning direction during the optical scanning of the input picture, for detecting a high-frequency component in the picture input signals being received by said detector circuit means to produce a high-frequency component signal; and picture signal processing circuit means connected to receive one of the picture input signals being received by said detector circuit means and responsive to the high-frequency component signal from said detector circuit means for switching between a simple binarization processing using single threshold data and a dithering binarization processing using dithering matrix threshold data for processing the one picture input signal being received by said picture signal processing circuit means;

wherein said detector circuit means comprises:

a line memory section connected to receive picture input signals from said picture input means for storing picture input signals corresponding to picture elements of the input picture on a plurality of scanning lines; and operation circuit means coupled to said line memory section for carrying out a convolution operation on the picture input signals corresponding to said picture elements in said two-dimensional picture-element array to produce the high frequency component signal.

4. The picture signal processing system according to claim 3, wherein said picture signal processing circuit means comprises:

first binarization circuit means connected to receive the one picture input signal for bi-level quantizing the one picture input signal with the single threshold data;

second binarization circuit means connected to receive the one picture input signal for bi-level quantizing the one picture input signal with the dithering matrix threshold data; and switching circuit means coupled to said first and second binarization circuit means and responsive to the high-frequency component signal from said detector circuit means for switching between output signals of said first and second binarization circuits.

5. The picture signal processing system according to claim 3, wherein said picture signal processing circuit means comprises:

first circuit means for providing the single threshold data;

second circuit means for providing the dithering matrix threshold data;

binarization circuit means connected to receive the one picture input signal and responsive to threshold data applied thereto for bi-level quantizing the one picture input signal; and means responsive to the high-frequency component signal for selectively coupling one of said first and second circuit means to said binarization circuit means to bi-level quantize the one picture input signal with a respective one of said single and dithering matrix threshold data.

6. A picture signal processing system for use in a picture reproduction apparatus including picture input means for optically scanning, line by line, an input picture having picture elements and varying in density to obtain a picture input signal for each of said picture elements, and picture output means for reproducing the input picture, comprising:

detector circuit means connected to receive picture input signals corresponding to picture elements in a two-dimensional picture-element array having a predetermined number of picture elements, said picture element array successively shifting by one picture element in a scanning direction during the optical scanning of the input picture, for detecting a high-frequency component in the picture input signals being received by said detector circuit means to produce a high-frequency component signal;

picture signal processing circuit means connected to receive one of the picture input signals being received by said detector circuit means and responsive to the high-frequency component signal from said detector circuit means for switching between a simple binarization processing using single threshold data and a dithering binarization processing using dithering matrix threshold data for processing the one picture input signal being received by said picture signal processing circuit means; and circuit means coupled between said detector circuit means and said picture signal processing circuit means for adding the high-frequency component signal to the one picture input signal being received by said picture signal processing circuit means.

7. A picture signal processing system for use in a color picture reproduction apparatus including color picture input means for optically scanning, line by line, a color input picture having picture elements and varying in density to obtain first, second and third color input signals for each of said picture elements, the first color input signal representing the brightness of each of said picture elements, and color picture output means for reproducing the color input picture, comprising:

color conversion circuit means connected to receive the first, second and third color input signals from said color picture input means for converting the first, second and third color input signals to fourth, fifth and sixth color signals used in said color picture output means to reproduce the color input picture;

detector circuit means connected to receive the first color input signal for detecting a local variation in the density of the color input picture to generate a local density variation detection signal; and picture signal processing circuit means connected to receive the fourth, fifth and sixth color signals and responsive to the local density variation detection signal from said detector circuit means for switching between a simple binarization processing using single threshold data and a dithering binarization processing using dithering matrix threshold data for processing each of the fourth, fifth and sixth color signals.

8. The picture signal processing system according to claim 7, further comprising:

coincidence detector circuit means coupled to outputs of said picture signal processing circuit means for detecting a coincidence in level among output signals of said picture signal processing circuit means which correspond to the fourth, fifth and sixth color signals, respectively; and gate circuit means connected to receive the first color input signal and the output signals of said picture signal processing circuit means and responsive to said coicindence detector circuit means for selectively coupling either the output signals of said picture signal processing circuit means or the first color input signal from said color picture input means to said picture output means.

9. A picture signal processing system for use in a color picture reproduction apparatus including color picture input means for optically scanning, line by line, a color input picture having picture elements and varying in density to obtain first, second and third color signals for each of said picture elements and color picture output means for reproducing the color input picture, comprising:

first, second and third averaging circuit means connected to receive the first, second and third color signals, respectively, for averaging the respective first, second and third color signals corresponding to picture elements in a two-dimensional picture-element array having a predetermined number of picture elements, said picture-element array representing a portion of the color input picture, said picture-element array successively shifting by one picture element in a scanning direction during the optical scanning of the color input picture;

local density variation detector circuit means coupled to said first averaging circuit means for detecting a local variation in the density of the portion of the color input picture represented by the picture-element array;

first, second and third color conversion circuit means each connected to receive output signals of said first, second and third averaging circuit means for producing fourth, fifth and sixth color signals used in said color picture output means to reproduce the color input picture; and first, second and third processing circuit means connected to receive the fourth, fifth and sixth color signals from said first, second and third color conversion circuit means, respectively, and responsive to said local density variation detector circuit means for switching between a simple binarization processing using single threshold data and a dithering binarization processing using dithering matrix threshold data for processing the respective fourth, fifth and sixth color signals;

wherein said local density variation detector circuit means comprises subtracter circuit means for calculating the difference between input and output signals of said first averaging circuit means; and said picture signal processing system further comprising mixer circuit means coupled to said first color conversion circuit means, said first averaging circuit means and said local density variation detector circuit means for mixing an output signal of said local density variation detector circuit means with said output signal of said first averaging circuit means being received by said first color conversion circuit means.

10. The picture signal processing system according to claim 9, further comprising:

first, second and third coordinate conversion circuit means each connected to receive the first, second and third color signals for providing first, second and third coordinate-converted color signals to said first, second and third averaging circuit means, respectively, in place of the first, second and third color signals, respectively, in place of the first, second and third color signals, respectively.

11. The picture signal processing system according to claim 10, further comprising:

first, second and third normalization circuit means connected to receive the first, second and third color signals, respectively, for normalizing the first, second and third color signals with respect to black and white reference signal levels, and for providing the normalized first, second and third color signals to each of said first, second and third coordinate covnersion circuit means in place of the first, second and third color signals, respectively.

12. The picture signal processing system according to claim 9, wherein said mixer circuit means is arranged to vary a mixing ratio of said output signals of said local density variation detector circuit means and said first averaging circuit means.

13. A picture signal processing system for use in a color picture reproduction apparatus including color picture input means for optically scanning, line by line, a color input picture having picture elements and varying in density to obtain first, second and third color signals for each of said picture elements and color picture output means for reproducing the color input picture, comprising:

first, second and third averaging circuit means connected to receive the first, second and third color signals, respectively, for averaging the respective first, second and third color signals corresponding to picture elements in a two-dimensional picture-element array having a predetermined number of picture elements, said picture-element array representing a portion of the color input picute, said picture-element array successively shifting by one picture element in a scanning direction during the optical scanning of the color input picture;

local density variation detector circuit means coupled to said first averaging circuit means for detecting a local variation in the density of the portion of the color input picture represented by the picture-element array;

first, second and third color conversion circuit means each connected to receive output signals of said first, second and third averaging circuit means for producing fourth, fifth and sixth color signals used in said color picture output means to reproduce the color input picture;

first, second and third processing circuit means connected to receive the fourth, fifth and sixth color signals from said first, second and third color conversion circuit means, respectively, and responsive to said local density variation detector circuit means for switching between a simple binarization processing using single threshold data and a dithering binarization processing using dithering matrix threshold data for processing the respective fourth, fifth and sixth color signals;

false color detector circuit means coupled to outputs of said first, second and third averaging circuit means for detecting whether or not colors represented by said output signals of said first, second and third averaging circuit means fall within colors which can be reproduced by said color picture output means and for producing a false color detection signal when the number of times it is detected that colors represented by said output signals of said first, second and third averaging circuit means do not fall within the colors which can be reproduced by said color picture output means exceeds a predetermined value for a predetermined region of said color input picture;

fourth, fifth and sixth averaging circuit means coupled to said first, second and third averaging circuit means, respectively, for averaging said output signals of said first, second and third averaging circuit means; and switching circuit means responsive to the false color detection signal from said false color detector circuit means for switching between output signals of said first and fourth averaging circuit means, between output signals of said second and fifth averaging circuit means, and between output signals of said third and sixth averaging circuit means for application to each of said first, second and third color conversion circuit means.

14. The picture signal processing system according to claim 13, wherein said false color detector circuit means is coupled to said first, second and third processing circuit means so that said first, second and third processing circuit means perform the dithering binarization processing when the false color detection signal is produced.

15. The picture signal processing system according to claim 13, wherein said first, second and third color conversion circuit means each comprise a first memory for storing a color conversion table, and said false color detecor circuit means comprises a second memory addressed by said outputs of said first, second and third averaging circuit means and having the same address space as each of said first memory, and wherein said second memory is programmed to output a signal indicating a false color when said output signals of said first, second and third averaging circuit means correspond to predetermined addresses of said second memory means.

* * * * *